(12) United States Patent
Wellings et al.

(10) Patent No.: US 7,132,531 B1
(45) Date of Patent: Nov. 7, 2006

(54) REACTOR

(75) Inventors: Donald Alfred Wellings, Northwich (GB); Ian George Thomas, Northwich (GB); Roger John Findon, Todmorden (GB)

(73) Assignee: Avecia Limited, Manchester (GB)

( * ) Notice: Subject to any disclaimer, the term of this patent is extended or adjusted under 35 U.S.C. 154(b) by 0 days.

(21) Appl. No.: 09/959,415

(22) PCT Filed: Apr. 20, 2000

(86) PCT No.: PCT/GB00/01467

§ 371 (c)(1),
(2), (4) Date: Oct. 26, 2001

(87) PCT Pub. No.: WO00/66258

PCT Pub. Date: Nov. 9, 2000

(30) Foreign Application Priority Data

Apr. 28, 1999 (GB) .................................. 9909630.7

(51) Int. Cl.
| | | |
|---|---|---|
| *C04H 21/00* | (2006.01) | |
| *C04H 21/02* | (2006.01) | |
| *C04H 21/04* | (2006.01) | |
| *B01J 19/20* | (2006.01) | |
| *B32B 5/02* | (2006.01) | |
| *B32B 19/02* | (2006.01) | |
| *B32B 19/08* | (2006.01) | |
| *B32B 27/24* | (2006.01) | |

(52) U.S. Cl. ..................... 536/25.3; 422/129; 422/131; 422/135; 422/136; 422/137

(58) Field of Classification Search ................ 422/129, 422/131, 135, 136, 137; 536/25.3
See application file for complete search history.

(56) References Cited

U.S. PATENT DOCUMENTS

| | | | |
|---|---|---|---|
| 3,759,879 A | | 9/1973 | Floros |
| 3,944,534 A | * | 3/1976 | Sennari et al. ................ 526/64 |
| 4,007,016 A | | 2/1977 | Weber |
| 4,017,396 A | | 4/1977 | Skau |
| 4,244,694 A | | 1/1981 | Farina et al. |
| 4,370,302 A | * | 1/1983 | Suzuoka et al. ............ 422/137 |
| 4,611,038 A | * | 9/1986 | Brun et al. ............... 526/169.2 |
| 5,152,971 A | | 10/1992 | Bertrand et al. |
| 5,728,267 A | | 3/1998 | Flaherty |

FOREIGN PATENT DOCUMENTS

| | | |
|---|---|---|
| DE | 37 43910 | 7/1988 |
| EP | 0 031 968 | 7/1981 |
| EP | 0 226 032 | 6/1987 |
| EP | 0 328 975 | 8/1989 |
| EP | 0 709 132 | 5/1996 |
| GB | 1 074 252 | 7/1967 |
| GB | 1 280 630 | 7/1972 |
| GB | 1 453 779 | 10/1976 |
| GB | 1 548 026 | 7/1979 |
| GB | 2 034 190 | 6/1980 |
| GB | 2 213 743 | 8/1989 |
| GB | 2 264 884 | 9/1993 |
| GB | 2 297 926 | 8/1996 |
| GB | 2 304 603 | 3/1997 |
| WO | WO 91/07648 | 5/1991 |
| WO | WO 94/02241 | 2/1994 |

OTHER PUBLICATIONS

Martin Edelstein et al.: "Design Considerations for Pilot Scale Peptide Synthesis Reactors", Chemical Enginering Science, vol. 41, No. 4, 1986, pp. 617-624, XP000952242 UK the whole document.

* cited by examiner

*Primary Examiner*—Patrick Lewis
(74) *Attorney, Agent, or Firm*—Pillsbury Winthrop Shaw Pittman LLP

(57) ABSTRACT

A reactor vessel for carrying out solid phase synthesis, particularly the solid phase synthesis of oligonucleotides, peptides, and combinatorial chemistry is provided. The reactor vessel comprises two or more orifices spaced from one another through which liquids within the vessel can be discharged and has a mounting enabling the vessel to be rotated about an axis so that each orifice can be moved into and out of a discharge position. Each orifice is adapted for closure by removable filtration means which are secured to the vessel to filter liquids discharging through the orifice when the orifice is in the discharge position. Processes for replacing the filtration means and for solid phase synthesis employing the use of an agitator are provided.

18 Claims, 2 Drawing Sheets

REACTOR

This application is the National Phase of International Application PCT/GB00/01467 filed Apr. 20, 2000 which designated the U.S.

The present invention concerns a reactor vessel and processes for solid phase synthesis.

The handling of heterogeneous reaction mixtures can often pose significant technical challenges to the development chemist wishing to manufacture industrial and commercial quantities of products. In particular, reactions wherein the constituents exist in different physical states, e.g. solid/liquid, often pose the most difficult challenges.

One area which highlights these difficulties is solid phase synthesis, an area of growing significance in the synthesis of simple and complex molecules. In particular the advantages that are offered by the developments in "smart chemistry" has created a trend towards the use of solid supports for the preparation of combinatorial libraries now predominantly used for new drug development.

The small (10 s of grams) scale handling of solid supports presents little problems in the manipulation of the solid support and the reagents used by the synthetic chemist in the laboratory. However, the scale up of such processes to develop useful industrial and commercial quantities of the products derived from solid phase synthesis poses some unique problems.

The conventional laboratory approaches to carrying out solid phase synthesis have centred on two types of reaction vessel. These can be classed as glass column types, for example sintered glass filter funnels, or glass shaker funnels. Both of these types of vessel utilise a durable glass sinter or frit to retain the solid support. Solid supports have many applications in solid phase synthesis and have been used as catalysts, scavengers and supported reagents. However, in most instances the molecule under construction is immobilised on the support which allows for ease of isolation at intermediate stages. Typically by-products and spent reagents are removed by washing after each reaction. The final product is cleaved or released from the solid and collected in solution. It is therefore important that efficient mixing of the solutions with the solid support is effected to facilitate complete reaction and fast throughput, and that the support can be readily separated from the solutions at the conclusion of any of the reaction stages.

Solvent wetted supports used in solid phase synthesis are often difficult to agitate. The properties of the mixture range from an immobile solid in solvent, somewhat similar to sand in water, through to a thick gelatinous slurry. In the former situation simple paddle type stirrers require a high level of torque to mobilise the mixture. Furthermore, when using a paddle type agitator blade to stir a thick slurry the solid support often travels up the walls of the vessel. The support deposited at the meniscus is not always mixed uniformly with reactor contents and this situation can lead to incomplete reactions and consequent heterogeneity in the cleaved product.

Additionally, solid supports are friable materials and agitation or stirring can often result in very small particulate material being formed over time. Blockage of the frits is a problem commonly observed in solid phase synthesis. In most systems the frit consists of a porous glass disc welded into the glass reactor (e.g. Advanced ChemTech Model 400 Large Scale Peptide Synthesiser). When the frit becomes blocked in this type of reactor the only solution is to slurry the contents, transfer these to another vessel and replace the reactor.

According to a first aspect of the present invention there is provided a reactor vessel having a) two or more orifices spaced from one another through which liquids within the vessel can be discharged; b) means for mounting the vessel enabling it to be rotated about an axis so that each orifice can be moved into and out of a discharge position, each orifice being adapted for closure by removable filtration means; and c) removable filtration means which are secured to the vessel to filter liquids discharging through an orifice when the orifice is in the discharge position.

The reactor vessel according to the present invention is particularly suited for carrying out solid phase synthesis.

Preferably the reactor vessel is pivotably mounted about a substantially horizontal axis, at a point along the vertical axis of the reactor vessel, said reactor vessel comprising two or more orifices adapted to receive filtration means, the reactor vessel being movable by rotation about an axis through the pivotable mount such that a first orifice at an in use position is moved to an out of use position and a second orifice is moved into the in use position.

The reactor vessel in one embodiment is of multi-component construction, the components being adapted to be connectable the other components which comprise the complete vessel. Preferably a reactor vessel of multi-component construction comprises a main body which is adapted to receive the base and optional header components.

The main body, or central portion, of the vessel is preferably of an upright substantially cylindrical nature. It may be of singular construction or sectional. Where the main body is of sectional construction, each section is preferably cylindrical, and preferably adapted to receive other sections or the header or base components. Preferably the sections comprising the main body are interchangeable.

The means employed to enable connection of sectional components may be such that the end construction of each section is complementary to that of the section to which it is to receive or join. The means may be of a screw thread variety, a snap to fit variety or of other suitable construction. Preferably, the means is a flange type arrangement. Effective sealing, to render the joint substantially liquid impervious, may be assisted by the optional use of sealing aids such as clamps, retaining bolts, o-rings, or gaskets. Most preferably, the end construction of the main body is terminated with similar means at each end allowing for ease of interchangeablility of the base and header components.

Optionally, portals or outlets may be mounted in the side walls of the main body. Such outlets are of dimension to allow for discharge of both solids and liquids, or for manual inspection of the vessel.

The means for mounting the reactor vessel enables rotation of the vessel about an axis. Preferably, the reactor is mounted is about a substantially horizontal axis of the reactor vessel. The means for mounting the reactor vessel may comprise moulded inclusions or protrusions which form an integral part of the reactor vessel, and are preferably located on the main body or a section of the main body. Alternatively, the means for mounting the reactor vessel may comprise an attachment mounted around or on the reactor vessel, preferably around or on the main body, a section of the main body, or at the juncture of two sections of the main body. The means for mounting the reactor vessel preferably engages a support mechanism external to the vessel which provides both to support the weight of the vessel in use and to allow for rotation of the vessel about the substantially horizontal axis. Preferably the means for mounting the reactor vessel provides means to pivotably mount the reactor vessel.

The means for mounting the reactor vessel is preferably located at a point substantially mid way along the vertical axis which represents the mid point of the reactor vessel between the orifices of the reactor vessel. Placement of the means for mounting the reactor vessel at or near the mid point may assist mechanically in the inversion of the vessel.

The orifices are preferably substantially circular. Preferably the orifices are interchangeable with respect to each other.

In a preferred embodiment the orifices adapted for closure by filtration means of the reactor vessel are preferably spaced in a substantially symmetrical arrangement. Preferably, the spatial arrangement of the orifices of the reactor vessel is such that for a given orifice there exists substantial planar symmetry and substantial rotational symmetry with respect to the other orifices of the reactor. More preferably, when there is substantial planar symmetry and substantial rotational symmetry in the spatial arrangement of the orifices of the reactor vessel, the plane of substantial planar symmetry intersects the axis of substantial rotational symmetry.

Preferably, when there is substantial planar symmetry and substantial rotational symmetry in the spatial arrangement of the orifices of the reactor vessel, the reactor is provided with a pivotal mounting located at a horizontal axis of substantial rotational symmetry with respect to the orifices of the reactor vessel. Preferably, said reactor vessel has two, three or four orifices adapted to receive filtration means. More preferably, said reactor vessel has two orifices adapted to receive filtration means and most preferably the orifices are diametrically opposed and advantageously along a vertical axis. Advantageously, such an arrangement enables the reactor vessel or the main body of the reactor vessel to be inverted and utilised in either configuration.

The optional header components of the reactor vessel may comprise either a top enclosure for the reactor vessel or may be substantially open with means provided for mounting or locating agitation means. Preferably a reactor top enclosure may be curved or substantially flat and may comprise one or more inlets or outlets, these preferably being suitable for the charging or discharging of gases and liquids and the connection of optional components such as a distillation head, sampling ports or stirrer glands. Mounting or locating of agitation means is preferably provided centrally and most preferably a central port is provided in the top enclosure adapted to receive a stirrer gland or stirrer drive shaft support mount.

The base components of the reactor vessel comprise the reactor base and filtration means. The reactor base may be curved or substantially flat and may comprise one or more inlets or outlets, these preferably being suitable for the charging or discharging of liquids and gases. The reactor base is adapted to connect to the main body of the reactor vessel. The filtration means may be located in the reactor base or preferably is located such that it is clamped or held between the reactor base and the main body of the reactor vessel. The filtration means is preferably designed to form a substantial barrier to particulate matter ensuring said matter is retained in the main body of the reactor vessel. The base components when connected to the main body of the reactor vessel are optionally sealable so as to prevent liquids escaping during reaction. The escape of liquids may also be prevented by the application of gas pressure, preferably an inert gas, most preferably nitrogen gas, to the base components through an inlet in the reactor base.

Filtration means which may be employed can be of single or multi-component construction. Examples of single component filtration means are porous frits. In certain embodiments it is preferable to employ multi-component filtration means. Multi-component filtration means may comprise one or more support plates capable of receiving a frit. The support plate may optionally comprise cross supports, lattice supports, or a flat plate comprising slots or holes in a geometric or random arrangement. The frit may optionally be constructed of porous glass, PTFE, stainless steel, titanium or material resistant to the reagents employed. Advantageously, the multi-component filtration means provides for a substantially rigid retainer of larger dimension frits which may enable these to withstand the substantial forces encountered in use.

In certain preferred embodiments, means is provided to heat or cool the reactor vessel. Examples of such means include jacketed vessels.

Main body, header and base components may be fabricated out of any material known in the art to be suitable for the construction of such components. Preferably components are fabricated from stainless steel, glass, or solvent resistant polymeric or composite materials such as PTFE. Additionally, components may be formed out of suitable materials which confer good engineering properties, such as rigidity, for example iron or iron alloys, but may be lined with suitably solvent inert materials for example glass or solvent resistant polymers.

The reactor vessels are of a volume appropriate to the scale of the solid phase reaction being carried out. In many embodiments, the volume of the reactor is up to 750 liters, commonly from about 10 to about 600 liters, such as from about 20 to about 250 liters, although reactors having a volume of greater than 750 liters may be employed if desired.

In a preferred embodiment, two substantially cylindrical columns with flanged ends are clamped together about a substantially horizontal axis, at or near the approximate mid point of the vertical axis of the reactor vessel. A lockable pivot is attached to the central clamps which facilitates rotation of the reactor vessel within its support scaffolding. A PTFE support plate fitted with a porous PTFE or stainless steel frit, is located between the lower column and reactor base. The reactor base is clamped to the lower column. This ensures the filtration means is held in place. The reactor base preferably has a single outlet. An optional top enclosure may be fitted by clamping to the upper column, the requirement for such a top enclosure may be dictated by safety or chemical handling requirements which are known to the skilled man.

Preferably, the reactor vessel of the present invention is employed in processes for solid phase synthesis. Solid phase synthesis is a term applied to techniques whereby solid supports are employed to enable the construction of simple or complex organic molecules. Examples of solid phase synthesis that may be carried out in the reactor vessel of the first aspect of the present invention include solid phase synthesis of organic molecules such as oligonucleotide synthesis, peptide synthesis, combinatorial chemistry and solid phase organic chemistry as discussed in Hermkens, P. H. H., Tetrahedron, 1996, Vol. 52, 4527–4554 and Kates, S. A., Peptide Science, 1988, Vol. 47, 309–411, incorporated herein by reference.

Typically, in solid phase reaction processes, a substrate attached to solid support by means of a cleavable linker is reacted with solution phase reagents to give a product attached to the solid support by means of the cleavable linker. The solid support is preferably a polymer based material. The cleavable linker is preferably an integral part of the solid support, but may also be conveniently attached to a solid support by reaction with some suitable functionality on the solid support. Examples of suitable solid supports are described in Atherton and Sheppard, Solid Phase Synthesis: A Practical Approach, Published by IRL Press at Oxford University Press; Wellings and Atherton, Methods in Enzymology, Published by Academic Press; Hermkens, P. H. H., Tetrahedron, 1996, Vol. 52, 4527–4554; and Kates, S. A., Peptide Science, 1988, Vol. 47, 309–411, such solid supports being incorporated herein by reference. Examples of the reactions carried out in processes involving solid phase synthesis include the following:—aromatic substitution (Heck & Suzuki reactions), nucleophilic and Pd mediated reactions, condensations (Aldol, Mannich pyrimidine), electrocyclic reactions (2+3, 2+2, 2+4), organometallic (Grignard, Li), Michael additions, alkylations, Wittig reactions, oxidations, radical reactions, reductions, carbene chemistry, acylations, alkynylation, alkyne chemistry, halogenation, carbonylation, carboxylation, cyclisation, deallylation, electrophillic addition, elimination reactions, enolate chemistry, enol ether chemistry, hydrolysis, free radical chemistry, hydroboronation chemistry, hydrocarboxylation, hydroformylation, silylation chemistry, ketene chemistry, metathesis, oxidation reactions, photochemistry, phosphorylation reduction, reductive reactions, sulphonation, asymmetric reactions, enzymatic reactions, transition metal catalysed reactions, and inorganic chemistry using coloured complexes.

In many preferred embodiments, the reactor vessel is utilised in processes or reactions which are known in the industry for the solid phase synthesis of peptides or oligonucleotides, for example, solid phase peptide synthesis employing 9-fluorenylmethoxycarbonyl (Fmoc) or 2-(4-nitrophenyl)sulphonylethoxycarbonyl (Nsc) protecting group technology, and solid phase oligonucleotide synthesis employing di-methoxytrityl (Dmt) protecting group technology.

Reactor vessels according to the first aspect of the present invention may be supplied as a kit of parts suitable for the construction of such a reactor vessel.

In one preferred mode of operation, the reactor vessel is charged with a solid support and solvent. Optionally, nitrogen gas may be injected into the reactor, preferably through the filtration means. It is preferable that the configuration of the vessel be such that the gas flow is evenly distributed across the filtration means. The percolation of the gas through the filtration means into the reaction mass may assist agitation. Reagents are then charged to the reactor. This may be a simultaneous addition of several reagents or may be the sequential addition of reagent components. In either case, after an appropriate contact time, the solution is discharged through the filtration means and the solid support may be sequentially washed with aliquots of fresh solvent. A vacuum may be applied to the reactor to aid the discharge process. Following completion of the appropriate reaction steps, the reactor is then charged with a solution which causes cleavage of the product from the solid support. After an appropriate contact time, the solution containing the product is discharged and pumped to an isolation vessel or to further reaction stages. The solid support is then washed free of contaminants prior to regeneration, disposal or re-use. Alternatively, the solid support can be removed from the reactor and cleaved independently in a separate vessel.

In use, the filtration means may become damaged or partially blocked. It may then be necessary or desirable to change the filtration means. The damaged or blocked filtration means is currently fitted to a first orifice which is at an in use position. A new filtration means is fitted to a second orifice which is in an out of use position. The reactor vessel is rotated such that the first orifice fitted with filtration means, which is damaged or to be replaced, is moved from an in use position to an out of use position and the second orifice fitted with filtration means, which is new or is a replacement, is moved into the in use position. The filtration means fitted to the first orifice may then be removed from the fittings while in the out of use position. Advantageously, the filtration means may be replaced without the need to discharge the solid support or other contents of the reactor vessel.

In many preferred embodiments, the reactor vessel of the present invention is equipped with agitation means. Agitation means may comprise blade or paddle stirrers. However, stirrers conventionally employed, especially paddle stirrers, may not provide effective fluidization of the reactor contents.

Thus according to a second aspect the present invention there is provided a process for solid phase synthesis which comprises the agitation of a solid phase reaction mass in a reactor vessel with an agitator, characterised in that the agitator comprises one or more helical agitator blades. Preferably, the agitator comprises two or more helical agitator blades adapted to rotate about a substantially common axis.

Examples of solid phase synthesis which may be employed in the second aspect of the present invention include those as hereinbefore described.

Examples of reactor vessels which may be employed in the second aspect of the present invention include those as hereinbefore described. Further examples of reactor vessels which may advantageously be employed in the second aspect of the present invention include pressure filter vessels.

The solid phase reaction mass preferably comprises a solid support suitable for solid phase synthesis and a solvent.

The agitator in one embodiment comprises one or more helical agitator blades attached to a drive shaft which runs along the axis about which the blades rotate. The blades may each independently be of variable length, width, thickness and contour.

The length of the blade results from the pitch or angle, of the blade and the distance traversed by the helix along the axis. Preferably, the distance traversed along the axis by at least one of the helical agitator blades should be equal to or greater than the height of the reaction mass in the reactor vessel. The height of the reaction mass will depend on the scale of the reaction and dimensions of the reactor vessel. In many preferred embodiments, the reaction mass is no greater the 0.5 m in height, and is often from about 0.3 m to about 0.4 m in height.

In many preferred embodiments the ratio of the Agitator Height to Agitator Diameter is less than 3:1, more preferably less than 2:1, and most preferably less than 1:1.

The pitch of the helical agitator blades may be expressed as a Pitch Angle and is preferably between 3 and 20 degrees, more preferably between 5 and 15 degrees, and even more preferably between 7 and 12 degrees. Alternatively, the pitch of the blade may also be conveniently expressed in terms of the Pitch Distance, which is the distance traversed along the axis by one complete spiral of the helical agitator blade.

Preferably the ratio of the Pitch Distance to Agitator Diameter is from 0.35:1 to 2.1:1, more preferably is from 0.5:1 to 1.2:1.

The width of the blade is preferably less than half the diameter of the agitator, the agitator diameter being determined by the internal diameter of the reactor vessel into which the agitator must fit.

Preferably the ratio of the Width of the Blade to the Agitator Diameter is from 0.06:1 to 0.22:1, such as from 0.1:1 to 0.2:1.

The minimum thickness of the blade is determined by the materials of construction. It therefore must be large enough to ensure the mechanical stability of the agitator. The minimum thickness can be calculated by known mechanical stress calculations. The maximum thickness is determined by the overall contour of the blade. As the thickness directly influences the mass of the agitator, and hence influences the inertia of the agitator, these factors will suggest optimum values for the thickness.

Preferably the mounting of the blades with respect to the axis of rotation is such as to ensure that at least a substantial length of the outer edge of at least one blade extends to the widest circumference which can be swept by the blade without collision with the walls of the reactor vessel.

Preferably the ratio of the Agitator Diameter to the Vessel Diameter is from 0.75:1 to <1:1, often greater than 0.88:1, such as from 0.95:1 to 0.985:1, and is often as close to 1:1 as can be achieved with regard to the tolerances of the agitator and reactor design.

Where more than one blade is present, it is preferred that two or more helical agitator blades are mounted such that they are concentric about the same spiral axis. Preferably at least two of the blades are of similar length, pitch, width and contour, and that the blades are mounted in such a manner as to be offset relative to the other. The angle by which the blades are offset is preferably such that the agitator rotates in a balanced manner. The offset angle for two or more identical sized blades mounted similarly, is preferably determined by the equation:

Offset Angle=360°/Number of Blades

In many preferred embodiments the helical agitator blades will have the same direction of screw thread about a substantially common axis, especially where the blades are of similar length, pitch, width and contour, and that the blades are mounted in such a manner as to be offset relative to the other.

Preferably up to four helical agitator blades are present. More preferably, two helical agitator blades are present.

In an especially preferred embodiment the agitator comprises two or more helical agitator blades adapted to rotate about a substantially common axis which have the same direction of screw thread about the substantially common axis. The width of these blades is less than the radius of the agitator, and the blades are so mounted such that a substantial length of the outer edge of each blade extends to the widest circumference which can be swept by the blade without collision with the walls of the reactor vessel. It is preferred that a scroll blade of opposite screw thread is employed, commonly the scroll blade being located along the substantially common axis.

In many preferred embodiments the scroll blade forms an integral part of a central shaft or tube which lies along the substantially common axis.

The distance traversed by the scroll blade may be shorter or equal or longer than the distance traversed by the longest helical agitator blade.

Preferably, the width of the scroll blade should be such as to enable the blade to fit inside the spirals formed by the arrangement of the helical agitator blades present, and most preferably the outer edges of the scroll blade should not be in contact with the inner edge of any of the helical agitator blades.

Preferably the ratio of the Scroll Blade Diameter to the Vessel Diameter is from 0.2:1 to 0.8:1, such as from 0.3:1 to 0.4:1.

Preferably the ratio of the Width of the Scroll Blade to the Agitator Diameter is from 0.2:1 to 0.66:1, such as from 0.3:1 to 0.5:1.

The pitch of the scroll blade may be expressed as a Pitch Angle and is preferably between 3 and 40 degrees, more preferably between 5 and 30 degrees, and even more preferably between 10 and 25 degrees. The pitch of the scroll blade may also be conveniently expressed in terms of the Pitch Distance, which is the distance traversed by one complete spiral of the scroll blade. The pitch of the scroll blade is often selected to be about 1.5 to 2.5 times that of the helical agitator blade, more often about two times that of the helical agitator blade.

Preferably the ratio of the Pitch Distance to Agitator Diameter is from 0.5:1 to 1.4:1, such as 0.6:1 to 1.2:1.

Agitators which comprise two or more helical agitator blades adapted to rotate about a substantially common axis which have the same direction of screw thread about the substantially common axis that also have a scroll blade of opposite screw thread located along the substantially common axis may offer improved fluidization properties. Such agitators seek to create fluid motion by drawing the fluid mass from the surface down the central core of the agitator, displacing the fluid to the outer circumference of the agitator at the bottom of the fluid mass, and propelling the displaced mass towards the surface substantially along the outer perimeter of the agitator.

In a further preferred embodiment of the second aspect of the present invention, an S-blade may be incorporated in the agitator. Such an S-blade provides for the easy discharge of solid materials through a side portal or outlet in the reactor vessel.

In many preferred embodiments, supports or braces are used to interconnect elements of the agitator to enhance engineering stability. Where a central shaft exists along the substantially common axis, it is preferable to utilise the shaft as an anchor point for a number of supports or braces.

The agitator may be of single or multi-component construction. Thus, the agitator may also comprise additional coupling components to facilitate the attachment of the agitator to a drive shaft such as flange or key lock couplings, or the agitator may comprise a central tubular shaft which may be adapted to receive a drive shaft.

Optionally, the agitator may be of a substantially hollow construction. This may be beneficial in reducing the mass of the agitator, but may also facilitate the cooling or heating of the reaction mass by allowing for the pumping of suitably heated or cooled fluids through the agitator core.

Preferably, the agitator should be constructed to have a substantially smooth finish, devoid of ridges or sharp edges, such that material is less inclined to collect on surfaces of the agitator.

In a particularly preferred embodiment of the second aspect of the present invention the agitator comprises two helical agitator blades of similar, and preferably the same, length, pitch, and contour, with a width of less than the radius of the agitator, and so mounted such that a substantial length of the outer edge of each blade extends to the widest circumference which can be swept by the blade without collision with the walls of the reactor vessel, each having the same direction of screw thread about a substantially common axis, mounted in such a manner as to be offset relative to each other, both adapted to rotate about a substantially common axis on which a scroll blade of opposite screw thread is located along the length of the axis and on which an S-blade is optionally attached.

In one preferred mode of operation, a reactor, fitted with means of agitation, is charged with a solid support. Solvent is added to the reactor, and the solid mass is agitated. The mass is agitated with an agitator as described in the second aspect of the present invention, the mass being circulated with the solid support being continually raised from the bottom of the reactor thereby enabling good mixing properties and even exposure to all resin particles. The rate of agitation will often vary depending upon, for example, the nature of the solid support. Often the rate of agitation may be up to 100 rpm. Preferably, the rate of agitation is from 15 to 30 rpm. Optionally, nitrogen gas may be injected through the bottom of the reactor. It is preferable that the configuration of the vessel be such that the gas flow is evenly distributed across the filtration means. The percolation of the gas through the filtration means into the reaction mass assists the agitation. Reagents are then charged to the reactor, this may be a simultaneous addition of several reagents or may be the sequential addition of reagent components. In either case, after an appropriate contact time, the solution is discharged by draining through the filtration means and the solid support is sequentially washed with aliquots of fresh solvent. A vacuum may be applied to the reactor to aid the discharge process. Following completion of the appropriate reaction steps, the reactor is then charged with a solution which causes cleavage of the product from the solid support. After an appropriate contact time, solution containing the product is drained and pumped to an isolation vessel or to further reaction stages. The solid support is then washed free of contaminants prior to regeneration, disposal or re-use. Alternatively, the solid support can be removed from the reactor and cleaved independently in a separate vessel. Preferably a reactor according to the first aspect of the present invention is used in solid phase synthesis.

Continual use of the reactor in solid phase synthesis can result in wear and tear on the filtration means. In extreme cases the filtration means may become blocked. Periodically, it is therefore necessary to replace the filtration means. In a preferred mode of operation, the agitator and any header components are first removed from the reactor which is still charged with solid support. Associated pipe-work is disconnected from the vessel. A replacement filtration means and base is secured to the top of the vessel. The vessel is then rotated within the support scaffolding holding the vessel in place, thus inverting the reactor. The old base and damaged filtration means can then be un-coupled. The associated pipe-work is reconnected. The agitator and header components reattached. The reactor is then returned to operation. Thus, it is possible to replace the filtration means without discharging the solid support. Advantageously, the helical agitator can easily be removed and re-introduced by applying slight rotation motion. Fluidization of the slurry by nitrogen agitation may also assist the replacement of the agitator.

In certain embodiments, it is preferable to supply a kit of parts comprising components suitable for the construction of a reactor vessel and agitator which may be employed in the second aspect of the present invention.

The invention is further illustrated, but not limited, by the following examples of a reactor, shown in FIG. 1 and FIG. 2, and an agitator, shown in FIG. 3.

Figure 1:
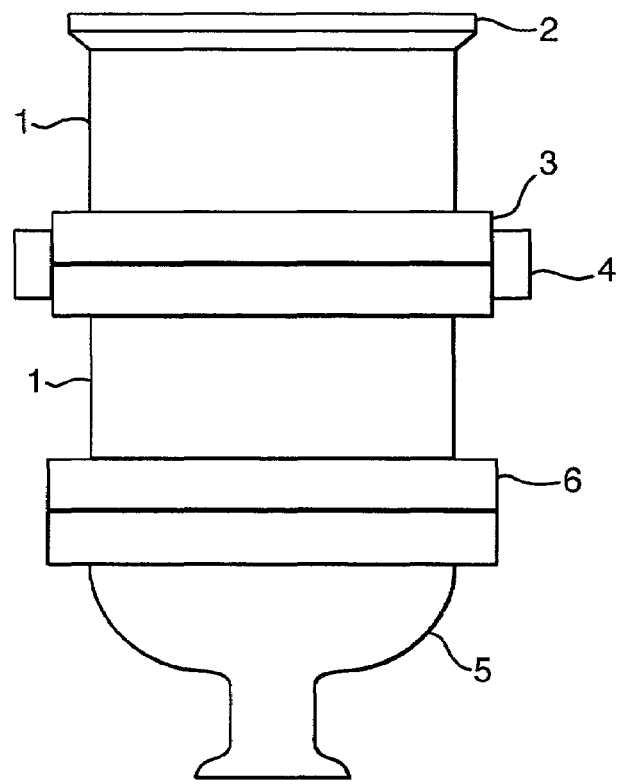
FIG. 1 shows a side view of a reactor according to the first aspect of the present invention.

Referring to FIG. 1, two cylindrical columns, 1, with flanged ends, 2, are clamped together by clamp, 3, to which lockable pivot, 4, attached. A reducer, 5, is clamped to the lower column, 1, by clamp, 6.

Figure 2:
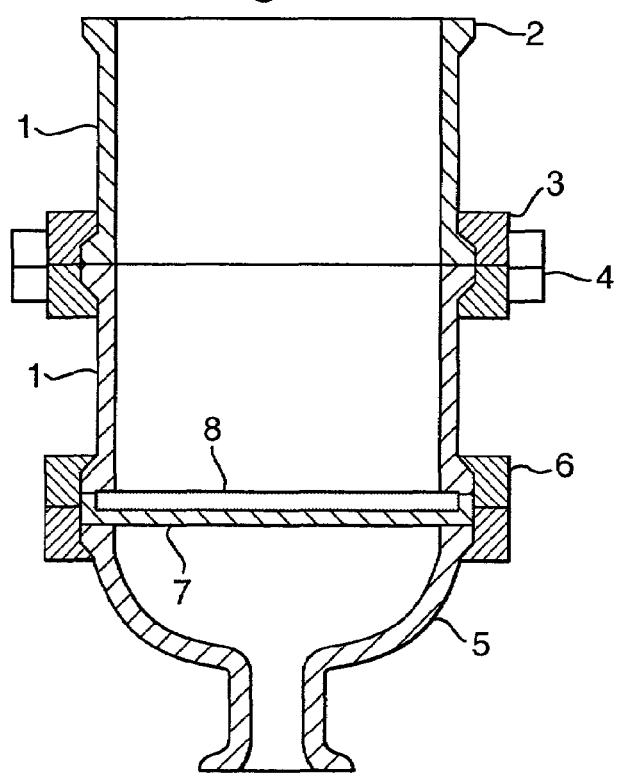
FIG. 2 shows a sectional view of a reactor according to the first aspect of the present invention.

Referring to FIG. 2, the two cylindrical columns, 1, with flanged ends, 2, the clamp, 3, to which lockable pivot, 4, is attached, the reducer, 5, and the clamp, 6, of the reactor in FIG. 1 are shown in cross-section. In addition, the support plate, 7, carrying a porous frit, 8, which are held between the lower of the two columns, 1, and the reducer, 5, are indicated. The diameter of frit, 8, is larger than the internal diameter of column, 1, this ensures that when the column, 1, the support plate, 7, holding the frit, 8, and the reducer, 5, are clamped together the frit, 8, is held securely in place and is not easily displaced if fluid or gas is pumped in an upward direction from the reducer into the vessel created by columns, 1.

In operation, the reactor vessel can be mounted in external scaffolding, not shown, by attachment to the lockable pivot, 4. The solid phase reagents are charged into the vessel created by the columns, 1, and retained in place by frit, 8, sitting on the support plate, 7. Liquid can be filtered through frit, 8, allowing for discharge of the vessel through reducer, 5. During reaction, reducer, 5, is sealable to prevent discharge of the liquid. Optionally, gas, preferably an inert gas, most preferably nitrogen gas, can be pumped into the vessel through reducer, 5, to prevent discharge of the liquid. The percolation of gas through frit, 8, into the reaction mass may assist with agitation of the reaction mass.

Figure 3:
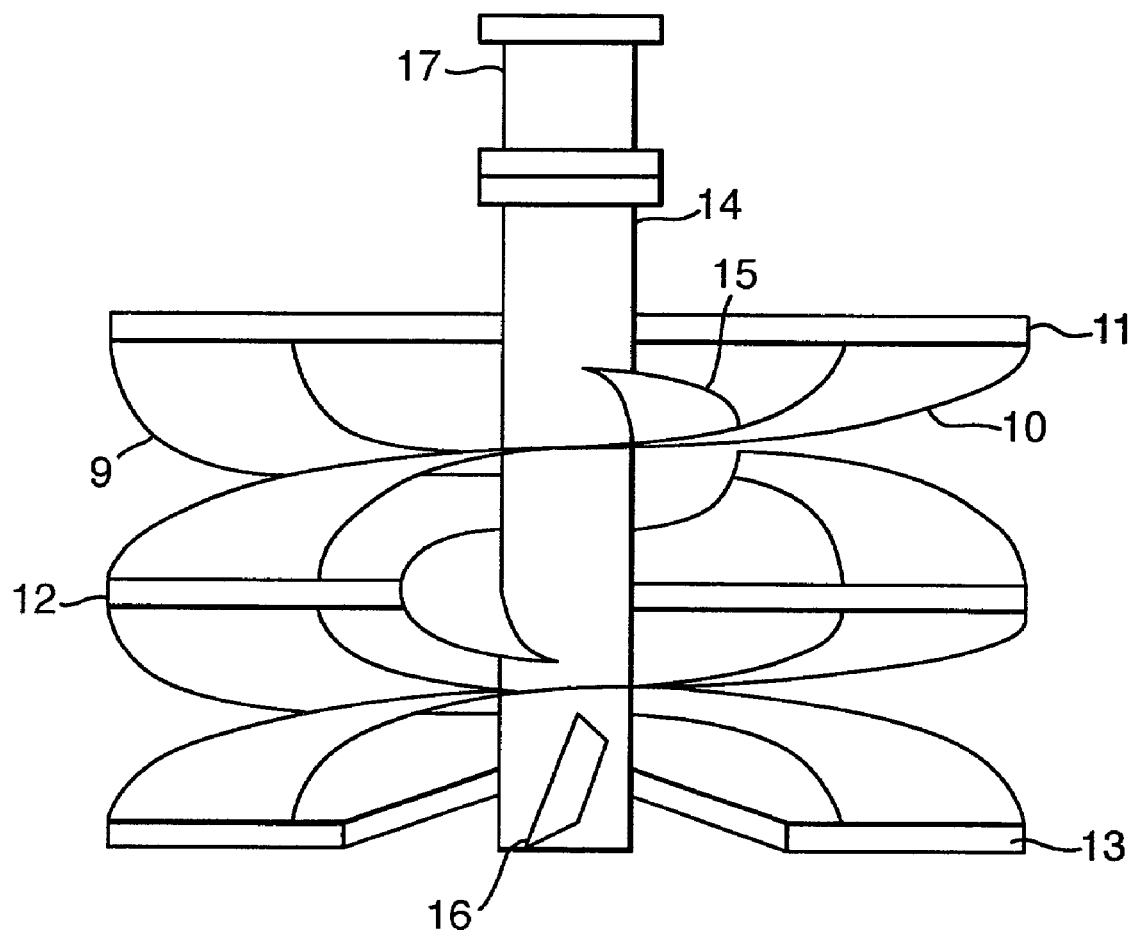
FIG. 3 shows a side view of an agitator as employed in the second aspect of the present invention.

Referring to FIG. 3, two helical agitator blades, 9, and, 10, are coupled by support bars, 11, 12 and 13, to a central shaft, 14. Mounted on the central shaft, 14, is a scroll blade, 15, and an S-blade, 16. The central shaft, 14, of the agitator, can be attached by means of a shaft coupling, 17, to an external drive shaft not shown.

The invention claimed is:

1. A process for solid phase synthesis comprising the step of agitating a solid phase reaction mass comprising a solid support suitable for solid phase synthesis and a solvent in a reaction vessel with an agitator, wherein the solid phase reaction mass undergoes a solid phase synthesis, and wherein the agitator comprises one or more helical agitator blades.

2. The process of claim 1, wherein the agitator has two helical agitator blades adapted to rotate about a substantially common axis.

3. The process of claim 2, wherein the agitator further comprises a scroll blade.

4. The process of claim 3, wherein the solid phase synthesis is a synthesis of peptides or oligonucleotides.

5. The process of claim 3, wherein the scroll blade has a pitch which ranges from 1.5 to 2.5 times that of the helical agitator blade.

6. The process of claim 1, further comprising the step of reacting a substrate attached to a solid support by means of a cleavable linker with solution phase reagents to produce a product attached to the solid support by means of the cleavable linker.

7. The process of claim 6, wherein the solid phase synthesis is a synthesis of peptides or oligonucleotides.

8. The process of claim 1, wherein the agitator has a ratio of agitator height to agitator diameter of less than 3:1.

9. The process of claim 8, wherein the ratio of agitator height to agitator diameter is less than 1:1.

10. The process of claim 9, wherein the solid phase synthesis is a synthesis of peptides or oligonucleotides.

11. The process of claim 1, wherein the agitator has a pitch angle ranging from 3 to 20 degrees.

12. The process of claim 11, wherein the pitch angle ranges from 7 to 12 degrees.

13. The process of claim 12, wherein the solid phase synthesis is a synthesis of peptides or oligonucleotides.

14. The process of claim 1, wherein the ratio of the agitator diameter to the vessel diameter ranges from 0.75:1 to less than 1:1.

15. The process of claim 14, wherein ratio of the agitator diameter to the vessel diameter ranges from 0.95:1 to 0.985:1.

16. The process of claim 15, wherein the solid phase synthesis is a synthesis of peptides or oligonucleotides.

17. The process of claim 3, wherein the agitator comprises two helical agitator blades adapted to rotate about a substantially common axis having the same direction of screw thread about the substantially common axis and a scroll blade of opposite screw thread located alone the substantially common axis.

18. The process of claim 17, wherein the solid phase synthesis is a synthesis of peptides or oligonucleotides.

\* \* \* \* \*